US009262166B2

(12) United States Patent
Kang et al.

(10) Patent No.: US 9,262,166 B2
(45) Date of Patent: Feb. 16, 2016

(54) EFFICIENT IMPLEMENTATION OF RSA USING GPU/CPU ARCHITECTURE (75) Inventors: Xiaozhu Kang, Fremont, CA (US); Biju George, San Jose, CA (US); Ken Lueh, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 47 days.

(21) Appl. No.: 13/997,239

(22) PCT Filed: Nov. 30, 2011

(86) PCT No.: PCT/US2011/062585
§ 371 (c)(1),
(2), (4) Date: Jun. 22, 2013

(87) PCT Pub. No.: WO2013/081596
PCT Pub. Date: Jun. 6, 2013

(65) Prior Publication Data
US 2013/0297919 A1    Nov. 7, 2013

(51) Int. Cl.
*G06F 9/45*      (2006.01)
*G06F 9/38*      (2006.01)
*G06F 9/30*      (2006.01)
*G06F 21/00*     (2013.01)

(52) U.S. Cl.
CPC  *G06F 9/38* (2013.01); *G06F 8/452* (2013.01); *G06F 9/30* (2013.01); *G06F 21/00* (2013.01)

(58) Field of Classification Search
None
See application file for complete search history.

(56) References Cited

U.S. PATENT DOCUMENTS

| 5,815,721 | A  | * | 9/1998  | Benitez ..................... 717/160 |
| 6,954,927 | B2 |   | 10/2005 | Ostanevich |
| 2003/0140241 | A1 |   | 7/2003 | England et al. |
| 2004/0039928 | A1 |   | 2/2004 | Elbe et al. |
| 2005/0144605 | A1 | * | 6/2005 | Motokawa et al. ......... 717/160 |
| 2005/0283773 | A1 |   | 12/2005 | Eichenberger et al. |
| 2007/0198412 | A1 |   | 8/2007 | Juffa |
| 2009/0158248 | A1 | * | 6/2009 | Linderman et al. .......... 717/106 |
| 2009/0213128 | A1 |   | 8/2009 | Chen |
| 2010/0128046 | A1 | * | 5/2010 | Wei ............................ 345/581 |
| 2010/0153654 | A1 |   | 6/2010 | Vorbach et al. |
| 2012/0075319 | A1 | * | 3/2012 | Dally .......................... 345/537 |
| 2013/0036408 | A1 | * | 2/2013 | Auerbach et al. ............ 717/140 |

OTHER PUBLICATIONS

International Search Report and Written Opinion mailed: Oct. 25, 2012 from corresponding PCT/US2011/062585 filed Nov. 30, 2011 (sixteen (16) pages).
Office Action and IPO Search Report received for Taiwanese Patent Application No. 101143272, mailed Mar. 26, 2015, 25 pages including 12 pages English translation.

\* cited by examiner

*Primary Examiner* — Don Wong
*Assistant Examiner* — Daxin Wu
(74) *Attorney, Agent, or Firm* — Kacvinsky Daisak Bluni PLLC (57) ABSTRACT

Various embodiments are directed to a heterogeneous processor architecture comprised of a CPU and a GPU on the same processor die. The heterogeneous processor architecture may optimize source code in a GPU compiler using vector strip mining to reduce instructions of arbitrary vector lengths into GPU supported vector lengths and loop peeling. It may be first determined that the source code is eligible for optimization if more than one machine code instruction of compiled source code under-utilizes GPU instruction bandwidth limitations. The initial vector strip mining results may be discarded and the first iteration of the inner loop body may be peeled out of the loop. The type of operands in the source code may be lowered and the peeled out inner loop body of source code may be vector strip mined again to obtain optimized source code.

25 Claims, 6 Drawing Sheets

EFFICIENT IMPLEMENTATION OF RSA USING GPU/CPU ARCHITECTURE

BACKGROUND

General-purpose computing on graphics processing units (GPGPU) is the technique of using a graphics processing unit (GPU), which typically handles computations only for computer graphics, to perform computations for applications traditionally handled by the CPU. GPUs are increasingly being used for general purpose computing. GPUs are well suited for throughput-oriented workloads with abundant parallelism such as task parallel (coarse grained) or data parallel (fine grained) computing. By contrast, CPUs are better suited for applications that are latency-sensitive and have implicit instruction-level parallelism.

One particular example that may benefit from GPGPU is RSA processing. RSA is an algorithm for public-key cryptography. The acronym RSA stands for Rivest, Shamir, and Adleman who were the individuals to first publicly describe the algorithm. RSA encryption and decryption is a computationally expensive algorithm. More research efforts are focusing on accelerating RSA decryptions because decryption is significantly more expensive computationally than encryption. The best CPU implementations of RSA decryption on the latest CPU still cost about 0.7 million cycles. Offloading such an expensive operation to the GPU can increase efficiency and free the CPU for other tasks. However, straightforward porting of a CPU RSA implementation to a GPU would lead to poor performance without utilizing the parallel processing power of the GPU. Accordingly, there may be a need for improved techniques to solve these and other problems.

DETAILED DESCRIPTION

Heterogeneous processor architectures integrate GPUs along with CPUs on the same die. While CPUs are better suited for applications that are latency-sensitive and have implicit instruction-level parallelism, GPUs target throughput-oriented workloads with abundant parallelism. When both throughput-oriented and latency-oriented processing cores exist on the same die, one may wish to exploit such cores operating in tandem to address heterogeneous workloads. From a performance perspective, GPUs placed on the processor die may receive a boost from cutting-edge CPU manufacturing processes and access to a large on-chip cache. Furthermore, the overhead of transferring data between CPU and GPU memory can virtually be eliminated through sharing the same main memory. In order to take full advantage of such an efficient integrated architecture, however, a programming platform that can seamlessly leverage GPU acceleration within an existing development environment is needed.

The C-for-media (Cm) platform is just such a platform. The Cm platform was originally developed to enable vendor-specific proprietary video-processing algorithms on integrated GPUs. Traditionally, acceleration of video processing phases was achieved through kernels embedded in the graphics driver. A driver would then access and execute these kernels to provide acceleration services when an application made application programming interface (API) calls.

The Cm platform may be characterized as a collaborative execution environment for exploiting both the CPUs and GPUs in heterogeneous processor architectures. Components of the Cm platform may include the Cm language, its implementation (e.g., a compiler) and the Cm runtime. The Cm language may be a simple extension to C/C++ that provides an intuitive interface to express data-parallelism at a higher level of abstraction. The Cm language was designed to efficiently leverage the single instruction multiple data (SIMD) capability of the GPU. The Cm runtime manages the execution environment while supporting an API that enables developers to easily invoke the GPU from their existing C/C++ application. The Cm compiler may generate optimized GPU machine code instructions from the GPU-targeted source code written in Cm in which as much parallelism as possible is extracted from the underlying GPU hardware. The Cm compiler may also include a Just-in-Time translator (Jitter) that enables running Cm programs on GPUs.

A goal of the Cm platform is to allow programmers to keep their existing applications, which are parallelized and/or optimized for the CPUs, but delegate the data-parallel or 'massively-parallel' segments of the application to the on-die GPUs. Modern CPUs are ideal for minimizing execution time of sequential programs through various architectural techniques to hide memory-latency and extract instruction-level parallelism. Moreover, multiple CPUs along with multi-threading capability per CPU are better suited for coarse-grained task-level parallelism. GPUs, on the other hand, are throughput-oriented processors primarily designed for embarrassingly parallel graphics applications. Consequently, in their general-purpose and programmable form GPUs are naturally suited for data-parallel program segments with abundant parallelism. The Cm platform provides a unified programming environment to exploit the full potential of a heterogeneous processor that includes both CPUs and GPUs.

As mentioned above, RSA encryption and especially decryption is a computationally expensive public key cryptography algorithm. Offloading such an expensive operation to the GPU can free the CPU for other tasks. The Cm platform can exploit both the CPU and GPU cores in heterogeneous processor architectures to improve RSA processing by having the CPU set up the GPU environment, execute the main RSA function, and pass data to the GPU that performs the actual calculations.

RSA Processing

RSA involves a public key and a private key. The public key can be known to everyone and is used for encrypting messages. Messages encrypted with the public key can only be decrypted using the private key. A typical RSA implementation involves three steps: key generation, encryption and decryption.

Key Generation

The public and private keys for an RSA algorithm may be generated as follows. The communicating parties may choose two random prime numbers p and q. For security purposes, the integers p and q should be chosen at random, and should be of similar bit-length. The communicating parties may then compute the product as n=pq. n may then be used as the modulus for both the public and private keys. $\phi(n)=(p-1)(q-1)$ may then be computed where $\phi$ is Euler's totient function. An integer e may be chosen such that e and $\phi(n)$ are co-prime or relatively prime. e may then be released as the public key exponent. A private key exponent, d, may be determined from the equation $(d*e) \bmod \phi(n)=1$. The public key may be comprised of the modulus n and the public (or encryption) exponent e. The private key consists of the modulus n and the private (or decryption) exponent d which must be kept secret.

Encryption

As an example, a first party may transmit its public key (n,e) to a second party and keep the private key (d) secret. Suppose the second party then wishes to send message M to the first party. The second party may first turn M into an integer m, such that 0<m<n by using an agreed-upon reversible protocol known as a padding scheme. The second party then computes a ciphertext c according to:

$$c=m^e \bmod n$$

This may be done quickly using the method of exponentiation by squaring. The second party may then transmit c to the first party.

Decryption

The first party may then recover m from c by using its private key exponent d by computing:

$$m=c^d \bmod n$$

Given m, the first party can recover the original message M by reversing the padding scheme. In practice, there may be more efficient methods of calculating $c^d$ using pre-computed values. For example, using the Chinese Remainder Algorithm and the following pre-computed values stored as part of the private key for optimization: p and q, $d_P=d \pmod{p-1}$, $d_q=d \pmod{q-1}$ and $q_{Inv}=q^{-1} \bmod p$, the recipient may compute the exponentiation $m=c^d \bmod pq$ more efficiently as follows:

$$m_1=c^{d_p} \bmod p$$

$$m_2=c^{d_q} \bmod q$$

$$h=q_{Inv}*(m_1-m_2) \bmod p$$

$$m=m_2+(h*q)$$

This may be more efficient than computing $m=c^d \bmod pq$ even though two modular exponentiations are to be computed. The reason is that these two modular exponentiations both use a smaller exponent and a smaller modulus.

Existing RSA computer implementations are generally designed for CPU execution and do not take advantage of the GPU's single instruction multiple data (SIMD) instruction set. However, a straightforward porting of the above CPU implemented RSA algorithm to the GPU would lead to poor performance without utilizing the parallel processing power of the GPU. An RSA computer implementation is presented that is tailored to the GPU's hardware supported SIMD sizes and alignment requirements and the ability to use SIMD instructions on the GPU to accelerate RSA processing. The end result may be a significant improvement in RSA processing.

To utilize the parallel processing power of the GPU a compiler optimization technique may be implemented that may be referred to herein as loop peeling. Loop peeling may obtain more efficient vector code for execution on the GPU.

Reference is now made to the drawings, wherein like reference numerals are used to refer to like elements throughout.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
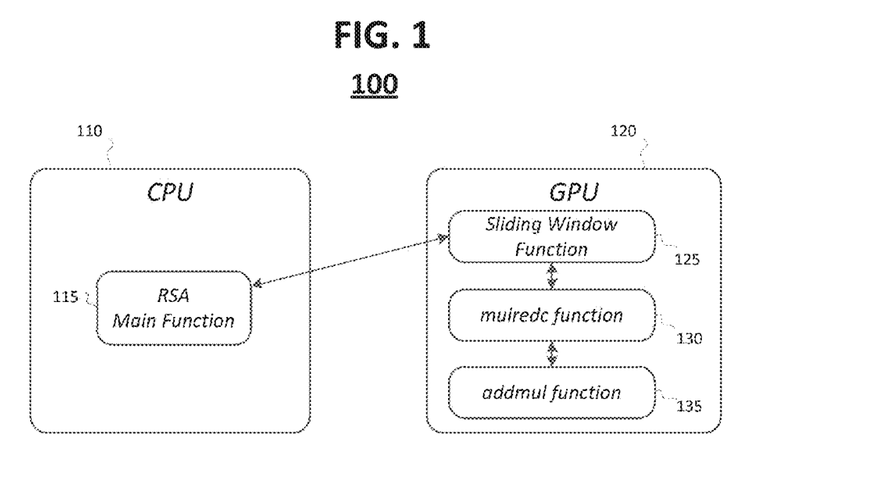
FIG. 1 illustrates a block diagram of a heterogeneous hardware architecture suitable for carrying out embodiments of the invention.

FIG. 1 illustrates a simplified block diagram of a heterogeneous hardware architecture suitable for carrying out RSA processing embodiments of the invention. A CPU 110 and a GPU 120 are communicable with one another such that the CPU 110 may be executing a main function such as, for instance, an RSA main function 115. The CPU RSA main function 115 may be coded such that it can make function calls to processes (e.g., GPU functions 125, 130, 135) that may be executing on the GPU 120. While the CPU 110 is better suited for applications that are latency-sensitive and have implicit instruction-level parallelism, the GPU 120 is targeted for throughput-oriented workloads with abundant parallelism. The GPU functions 125, 130, 135 that may be called by the RSA main function 115 on the CPU 110 may include a sliding window function 125 that performs modular exponentiation operations, a mulredc function 130 that performs modular multiplication operations with word by word reduction in Montgomery space, and an addmul function 135 that performs big number multiplication operations. The GPU functions 125, 130, 135 may be responsible for performing the large and computationally expensive mathematical operations associated with the RSA algorithm.

The RSA main function 115 may pass the data parameters of the Chinese Remainder Theorem to the GPU functions 125, 130, 135. The parameters described above can be restated as:

$$M=((q^{-1} \bmod p)(C_p^{d_p} \bmod p - C_q^{d_q} \bmod q) \bmod p)*q + C_q^{d_q} \bmod q$$

in which M represents the plain text of the encrypted message subject to RSA processing. The RSA decryption formula for M may be forwarded to the GPU 120 for computation. First, the RSA parameters passed by the CPU 110 may be loaded. The sliding window function 125 may utilize the mulredc function 130 to compute two modular exponentiations with half size as:

$$C_p^{d_p} \bmod p$$

$$C_q^{d_q} \bmod q$$

The mulredc function 130 may then be utilized to compute the rest of the formula to derive M using modular multiplication operations with word by word reduction in Montgomery space and return the result back to the CPU 110. In computing M, the mulredc function 130 may call the addmul function 135 to perform the big number multiplication operations needed to complete the computation of M. The addmul function may be the most frequently called function in computing for M and may provide greater RSA processing efficiency if it can be optimized.

Figure 2:
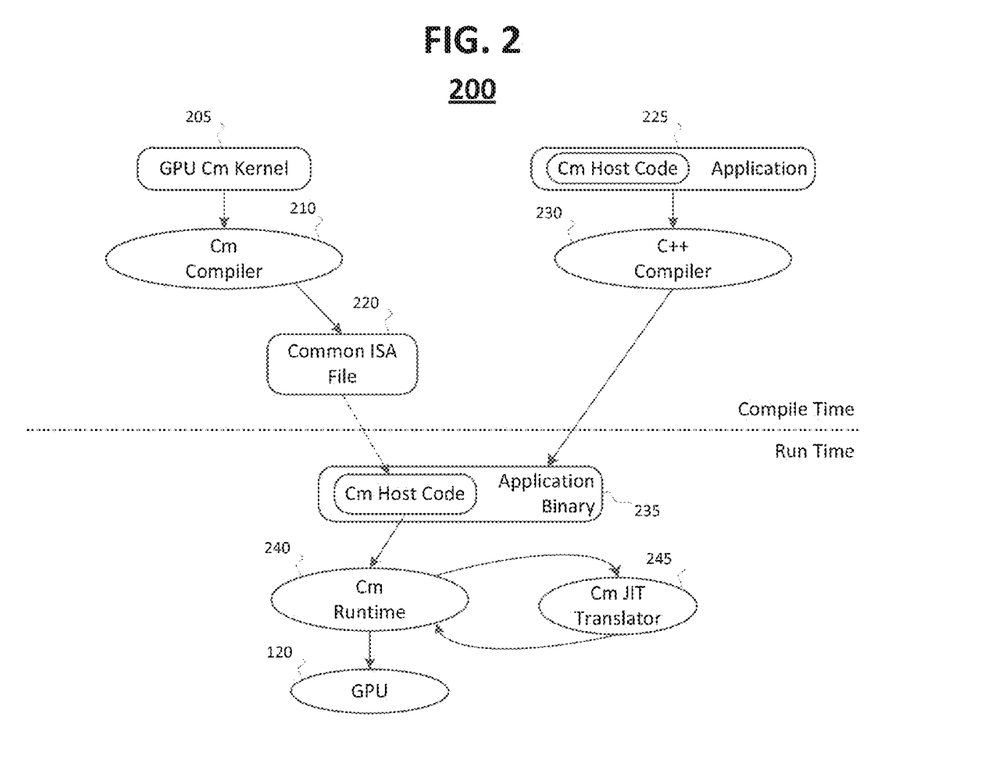
FIG. 2 illustrates a block diagram of an example toolset and execution model suitable for carrying out the embodiments of the invention.
Figure 3:
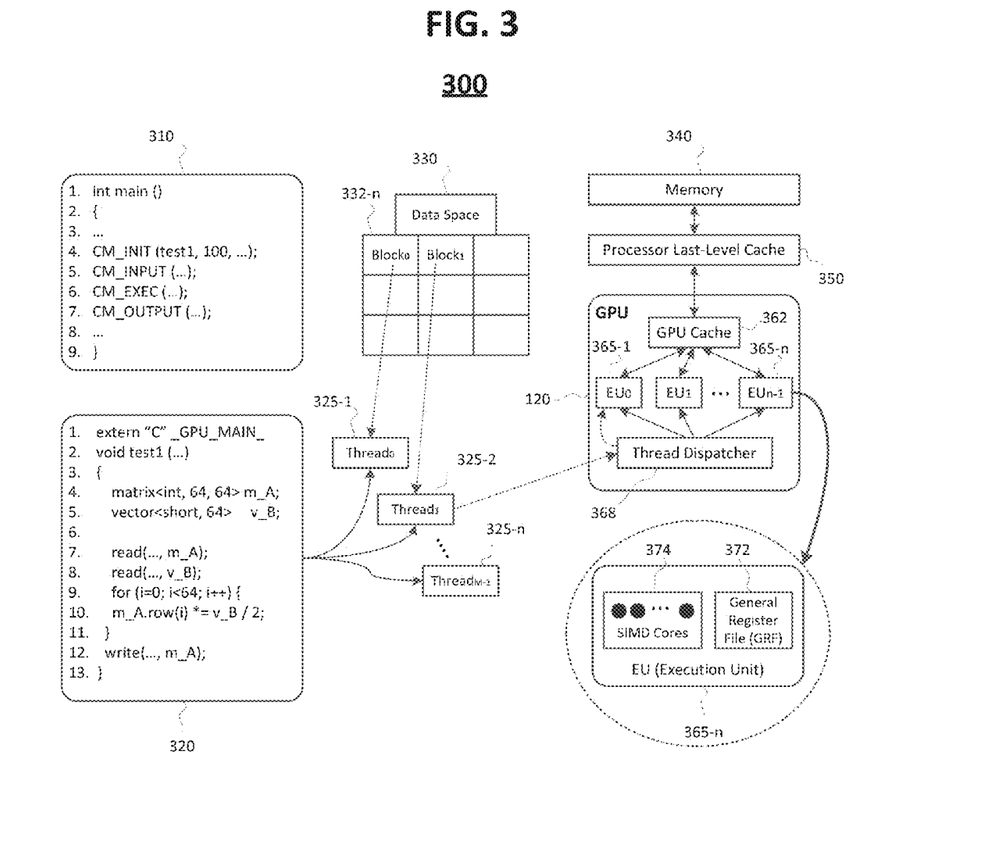
FIG. 3 illustrates a block diagram of an example programming model suitable for carrying out the embodiments of the invention.

FIG. 2 illustrates a block diagram of an example Cm platform toolset and execution model while FIG. 3 illustrates a block diagram of an embodiment of a Cm platform programming model suitable for carrying out RSA processing according to embodiments of the invention.

From a programmer's perspective, an application (e.g., RSA) using a Cm programming model 300 includes two modules: a host application 225 to be executed on CPUs, and GPU Cm kernels 205 targeted for a GPU 120. The host application 225 may be a normal C/C++ program that can be compiled by a C++ compiler 230 to a binary application 235 for execution on a CPU 110. However, to utilize a GPU 120 to accelerate certain segments of the code, developers may need to setup and invoke the GPU 120 through Cm runtime API calls inserted into the host application 225. The GPU targeted code may need to be organized into GPU Cm kernels 205 that may be written in the Cm language and may be processed by a Cm compiler 210 to create machine code that may execute on a GPU 260. A GPU Cm kernel 205 may be instantiated into a user-specified number of threads 325-$n$. Each thread 325-$n$ may then be scheduled to run on an in-order SIMD processing unit called an Execution Unit (EU) 365-$n$. Unlike the Open Computing Language (OpenCL) or the Compute Unified Device Architecture (CUDA), a single thread 325-$n$ in Cm operates on a block 332-$n$ of data. SIMD computations over the block 332-$n$ of data are expressed in Cm and efficiently translated to an instruction set architecture (ISA) file 220 by the Cm compiler 210.

As an example, a host main( ) function 310 is shown in FIG. 3 that is to be executed on a CPU 110. The host main( ) function 310 may include code to initialize and setup the GPU 120 and GPU kernels 205 (lines 3 and 5), invoke the GPU 120 to execute the GPU kernels 205 (line 6), and read the output back (line 7). For clarity, macros have been used to hide actual runtime APIs. The function test1( ) 320 shown below the function host main( ) 310 may be annotated with the Cm keyword "_GPU_MAIN_" to indicate that the function test1( ) 320 may be a Cm GPU kernel 205 to be executed on a GPU 120. Threads 325-$n$ instantiated from the GPU Cm kernel 205 may operate on user-determined blocks 332-$n$ of the data space 230 and may be dispatched by thread dispatcher 368 to run on one or more EUs 365-$n$ in the GPU 120. There may be threads 325-$n$ from multiple GPU Cm kernels 205 in a single GPU invocation. Only one thread 325-$n$ can be executed on a single EU 365-$n$ until its completion, but every EU 365-$n$ can have multiple co-resident threads 325-$n$ that are time-sliced to increase overall execution throughput. Each EU 365-$n$ may include multiple SIMD lanes 374 that may be used to execute its SIMD instructions that may be part of its ISA and generated by the Cm compiler 210 from the GPU Cm kernels 205. Every EU 365-$n$ may also have access to a large general register file (GRF) 372 to reduce memory-access overhead. For optimal performance, it may be advisable to keep the entire working-set of a kernel within the GRF 372. Memory-access latency may be further hidden from the EUs 365-$n$ through a common GPU cache 362 inside the GPU 120 and the large processor-level cache 350 which may be shared with all the CPUs.

In the illustrated Cm parallel processing model 300 of FIG. 3, programmers may identify data-level parallelism in the algorithm and refactor existing sequential code, if needed, to expose fine-grained parallelism in the GPU Cm kernels 205. Conceptually, the data space 330 may need to be divided into thread and EU-friendly blocks 332-$n$ and computations on them expressed in GPU Cm kernels 205. As exemplified in the function test1( ) 320 GPU Cm kernel 205, a typical computation cycle in this particular GPU Cm kernel 205 may include: (i) read data blocks from memory 340 to GRF 372 (lines 7 and 8), (ii) operations on the read data (lines 9-11), and (iii) write the computed output from GRF 372 to memory 340 (line 12). Programmers may be encouraged to expose as much parallelism as possible within a block 332-$n$ of data as the Cm compiler 210 may be responsible for reducing the degree of parallelism to match resources available in an EU 365-$n$.

As shown in FIG. 2, the GPU Cm kernels 205 may be compiled by the Cm compiler 210 to an intermediate language common ISA file 220. Common ISA is a high-level, generic assembly language that may be translated to run on any current or future GPUs. At runtime, a Cm JIT compiler 245 may translate the common ISA file 220 into GPU executable code. Next, a host application 225 may be compiled into a binary application 235 by a C++ compiler 230. At runtime, the binary application 235 may call the Cm-runtime APIs to setup and execute on the GPU 120. The Cm runtime 240 may provide the desired hardware abstraction layer to the application. The Cm runtime 240 may manage device creation, set up input and output buffers, perform kernel creation, set up thread arguments, and dispatch kernels to the GPU 120. During kernel creation, the Cm runtime 240 may invoke the Cm JIT compiler 245 to generate GPU binary from the common ISA file 220. Subsequently, thread creation and scheduling may be performed entirely in hardware by the GPU's thread dispatcher 368. Thus, the CPU 110 is responsible for creating a command queue, queuing tasks, creating memory, passing data to the GPU, and obtaining results from GPU 120 while the GPU 120 performs the real RSA calculation(s).

Included herein are one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
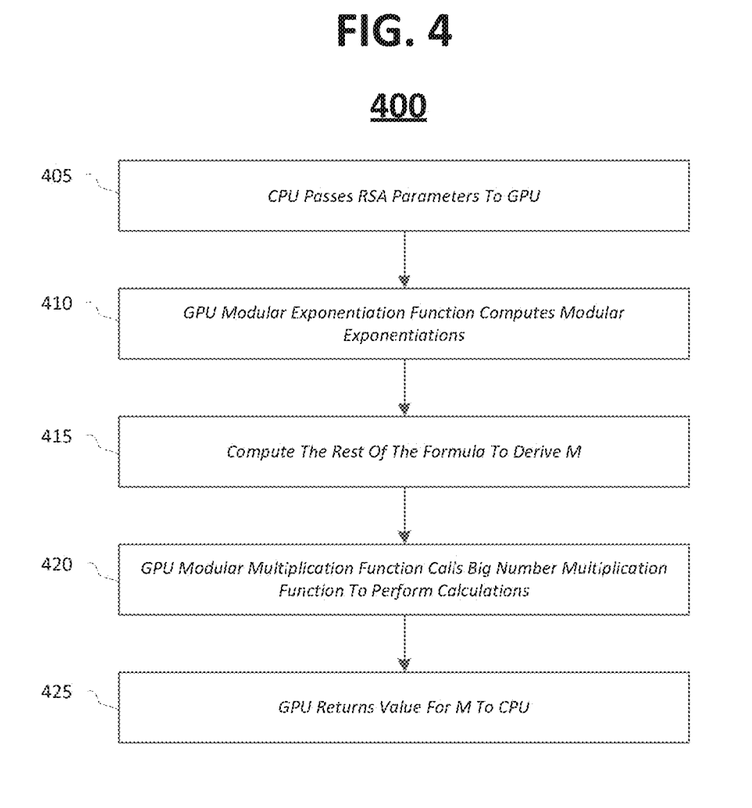
FIG. 4 illustrates one embodiment of a logic flow.

FIG. 4 illustrates one embodiment of a logic flow for carrying out embodiments of RSA processing on a heterogeneous CPU/GPU processing architecture. The logic flow 400 may be representative of some or all of the operations executed by one or more embodiments described herein.

In the illustrated embodiment shown in FIG. 4, the logic flow 400 may pass RSA parameters from the CPU 110 to the GPU 120 at block 405. For example, the parameters $C_p$, $C_q$, p, q, $d_p$, $d_q$, and $q^{-1}$ mod p may be passed from the RSA main function 115 executed by CPU 110 to the sliding window function 125 executed by GPU 120. The embodiments are not limited to this example.

The logic flow 400 may compute modular exponentiations at block 410. For example, the sliding window function 125 may receive the RSA parameters $C_p$, $C_q$, p, q, $d_p$, $d_q$, and $q^{-1}$ mod p and may begin processing them to solve for M, the encrypted message. The logic flow 400 may utilize the sliding window function 125 having a window size=5 to compute two modular exponentiations of half size, $C_p^{d_p}$ mod p, and $C_q^{d_q}$ mod q. Inside the sliding window function 125, sixteen (16) calls to the mulredc function 125 may be made to pre-compute a table for the parameters $C_p$, $C_q$, p, q, $d_p$, $d_q$, and $q^{-1}$ mod p. Once the table is pre-computed, the mulredc function 125 may be called again inside the conditional branches of the inner loop. The embodiments are not limited to this example.

The logic flow 400 may compute the rest of the formula to derive M at block 415. For example, the sliding window function 125 may call the mulredc function 130 to perform, for instance, multiple modular multiplication operations along with sub, add, mul, mulredc, redc operations to compute the rest of the formula to derive M. For the big number modular exponentiation operation, a sliding window method as performed by the sliding window function 125 may be more efficient than a binary scan method. This is because the sliding window function 125 uses fewer modular multiplication operations to perform the modular exponentiation operation. A window size of five (5) may be chosen as a reasonable tradeoff between speed and memory requirements needed to store the pre-computed parameter table. The math function sub may perform large number subtraction. The math function add may perform big number addition. The math function mul may perform modular multiplication. The math function redc may perform modular reduction. mulredc and redc may be used in the sliding window function. sub may be used by mulredc. sub and add may also be used in the main RSA computation process to derive M. The embodiments are not limited to this example.

The logic flow 400 may call the addmul 135 at block 420. For example, the mulredc function 130 may call the addmul function 135 to perform big number multiplication operations. The addmul function 135 may be optimized using vector strip mining and loop peeling techniques. The embodiments are not limited to this example.

The logic flow 400 may return the deciphered value for M to the CPU 110 at block 425. For example, the GPU 120 upon completing its calculations and computing M may return its results to the RSA main function 115 executing on CPU 110. The embodiments are not limited to this example.

Loop Peeling

A first RSA optimization technique may be termed loop peeling. Loop peeling results in better vector codes by better conforming vector operands to specific hardware supported SIMD sizes and alignment requirements. The loop peeling technique may be implemented for the addmul function to significantly improve RSA processing efficiency since addmul is the most called function when computing M.

The process of optimally reducing high level instructions of arbitrary vector lengths, particularly within a loop, into hardware supported vector widths may be referred to as "vector strip mining". Loop peeling may improve vector strip mining compiler optimization by generating fewer instructions of higher vector widths that better utilize the available instruction bandwidth within the critical inner loop. For example, the loop peeling and code optimization example described herein may be able to cut the shift operation in the inner loop from 7 movs to 3 movs of machine code. This reduction may result in improved RSA processing efficiency. The critical inner loop for the RSA algorithm may currently be coded in Table 1 as:

TABLE 1

```
vector<uint,16> prod;
...
vector<uint,16> shift;
shift = 0;
do {
   shift.select<15,1>(1)=prod.select<15,1>(0);
   temp += shift;
   prod.merge(1,0, temp < shift);
   res += prod(15);
} while (prod.any( ));
```

The shift operation above may be compiled by, for instance, a Cm compiler into machine code for GPU execution that comprises seven (7) movs when conforming to hardware supported SIMD sizes and alignment requirements of the GPU as shown in Table 2.

TABLE 2

```
mov (4) r54.1<1>:ud r50.0<4;4,1>:ud {Align1}
mov (2) r54.5<1>:ud r50.4<2;2,1>:ud {Align1}
mov (1) r54.7<1>:ud r50.6<0;1,0>:ud {Align1}
mov (1) r55.0<1>:ud r50.7<0;1,0>:ud {Align1}
mov (4) r55.1<1>:ud r51.0<4;4,1>:ud {Align1}
mov (2) r55.5<1>:ud r51.4<2;2,1>:ud {Align1}
mov (1) r55.7<1>:ud r51.6<0;1,0>:ud {Align1}
```

A key compiler optimization for a vector language such as Cm involves reducing high level Cm source code instructions of arbitrarily large vector lengths into a sequence of component source code instructions of smaller vector lengths that are equal to or less than the maximum vector length supported by an instruction in hardware. The GPU compiler optimization goal is to maximize the vector lengths of the compiled machine code instructions to better utilize the instruction bandwidth provided by the hardware and thus maximize performance. For a GPU, achieving an instruction width of eight (8) or sixteen (16) best utilizes the available instruction bandwidth because the instruction pipeline will internally reduce instructions having vector lengths of sixteen (16) into component instructions having vector lengths of eight (8). An impediment to the goal of this optimization is that the reduced instruction operands must be aligned according to the operand alignment rules of the hardware.

In classic vector strip mining the input source code instructions are scalar instructions. The compiler must unroll a loop of code by a factor generally equal to the maximum vector length supported by the hardware so that (i) the unrolled instructions may be combined into vector instructions of widths equal to the maximum hardware supported width, and (ii) the instruction operands respect the operand alignment requirements of the hardware. In the Cm platform, however, the source code already includes vector instructions. Thus, there is no need for the compiler to unroll the loop. The source code is already in vector form albeit of widths larger than the hardware supported widths. The problem becomes that of decomposing the vector instructions into constituent vector instructions wherein each constituent vector instruction (i) has a vector width equal to or less than the maximum hardware supported width, and (ii) the instruction operands respect the operand alignment requirements of the hardware. The optimization described herein maximizes the vector length of the constituent vector instructions to the available instruction bandwidth.

In general, strip mining code that is already in vector form should yield significantly better results compared to classic vector strip mining. This is because the input source code used in classic vector strip mining is in scalar form where it is not always possible to unroll loops by the required factor very easily.

For the critical inner loop of the RSA kernel source code, the maximum hardware width permitted for a native vector instruction of type Dword is eight (8). Because of the unaligned destination region (r54.1:d) in the critical shift operation, the source code cannot be compiled into reduced instructions of this width and the instruction cannot be strip mined efficiently. As shown above, the source code may be compiled into seven (7) machine code instructions of widths 4, 2, 1, 1, 4, 2, 1 for the critical shift operation. Since the width of all the compiled machine code instructions is less than eight (8), none of the machine code instructions optimally utilize the available instruction bandwidth and overall performance suffers.

The strip mining optimization phase may be improved to take advantage of two compiler derived observations to generate more efficient code for the shift in the critical inner loop.

First, the compiler may obtain higher SIMD sizes for operations if the operands are of smaller sizes. This may be achieved using ushort operands instead of uint operands. A single uncompressed instruction in a GPU can operate on sixteen (16) shorts or eight (8) ints.

Second, from the second iteration of the critical inner loop of the source code, the shifted values are either 0s or 1s that can be represented by using a ushort type. This is determined based on constructed definition use links. In the example shown in Table 1, there are two definitions for the use of the variable prod in the inner loop. One definition is the initialization for prod which is outside the loop, while the other definition is loop carried from the merge statement inside the same loop. Additionally, it can be determined that while the result of the initialization definition of prod from outside the loop requires Dword precision, the result of the loop carried definition being only 1s and 0s requires only word precision.

Based on the two observations, the first iteration of the inner loop may be peeled out prior to strip mining. The type for the operand prod used in the critical shift operation in the remainder of the inner loop may then be lowered from u32 to u16. The type for the shift may be lowered as well because its initialization definition outside the loop is zero (0) which can be represented in ushort and its loop carried definition is prod which was just lowered to word type in the peeled out remainder of the inner loop. The loop peeling step may be performed only if it is anticipated that doing so would enable the subsequent vector strip mining optimization to generate better vector code.

Based on the above, the optimized transformed code for the inner loop may be re-written as shown in Table 3 in which the type lowered operands used in the peeled out loop are named wshift and wprod.

TABLE 3

```
vector<uint,16> prod;
...
vector<uint,16> shift;
vector<ushort, 16> wprod;
shift = 0;
shift.select<15,1>(1) = prod.select<15,1>(0);
temp += shift;
wprod.merge(1,0, temp < shift);
res += prod(15);
vector<ushort,16> wshift;
wshift(0) = 0
while (wprod.any( )) {
  wshift.select<15,1>(1)=wprod.select<15,1>(0);
  temp += wshift;
  wprod.merge(1,0, temp < wshift);
  res += wprod(15);
}
```

The above optimized code may be compiled into machine code instructions comprising four (4) movs as shown in Table 4.

TABLE 4

```
mov (8) r19.1<1>:uw r17.0<8;8,1>:uw {Align1}
mov (4) r19.9<1>:uw r17.8<4;4,1>:uw {Align1}
mov (2) r19.13<1>:uw r17.12<2;2,1>:uw {Align1}
mov (1) r19.15<1>:uw r17.14<0;1,0>:uw {Align1}
```

It is noted that only the first mov in the machine code instruction sequence shown in Table 4 optimally utilizes the available instruction bandwidth for the GPU hardware, while the other three (3) mov instructions still under-utilize the available instruction bandwidth. Nevertheless, the compiled instruction throughput is better than the original un-optimized code that was compiled into machine code that comprised seven (7) under-utilized movs (See, Table 2).

At this point an additional optimization to the layout of type lowered variables may be made to further reduce the number of the movs in the inner loop. The 16-wide wshift variable may be split into two 9-wide wshift1 and wshift2 variables. This improved layout may result in the following transformed optimized source code shown in Table 5 in which the type lowered operands used in the peeled out inner loop are named wshift1, wshift2, and wprod.

TABLE 5

```
vector<uint,16> shift;
shift(0) = 0;
shift.select<15,1>(1)=prod.select<15,1>(0);
temp += shift;
vector<ushort,16> wprod;
wprod.merge(1,0, temp < shift);
res += wprod(15);
vector<ushort,9> wshift1;
vector<ushort,9> wshift2;
wshift1(0) = 0;
while (wprod.any( )) {
  wshift1.select<8,1>(1)=wprod.select<8,1>(0);
  wshift2(0) = wprod(7);
  wshift2.select<8,1>(1)=wprod.select<8,1>(8);
  temp.select<8,1>(0) += wshift1.select<8,1>(0);
  temp.select<8,1>(8) += wshift2.select<8,1>(0);
  wprod.select<8,1>(0).merge(1,0, temp.select<8,1>(0) <
    wshift1.select<8,1>(0));
  wprod.select<8,1>(8).merge(1,0, temp.select<8,1>(8) <
    wshift2.select<8,1>(0));
  res += wprod(15);
}
```

The shift operation sequence in the inner loop may now be compiled into machine code instructions comprising 3 movs as shown in Table 6 below.

TABLE 6

```
mov (8) r19.1<1>:uw r17.0<8;8,1>:uw {Align1}
mov (1) r22.0<1>:uw r17.7<0;1,0>:uw {Align1}
mov (8) r22.1<1>:uw r17.8<8;8,1>:uw {Align1}
```

This may be the optimal machine code instruction sequence because only one instruction in the shift operation underutilizes the available bandwidth which cannot be avoided. Although the SIMD16 merge instruction has been split into two SIMD8 instructions, the instruction throughput remains the same because the instruction pipeline will internally break down the SIMD16 instruction into two SIMD8 instructions automatically.

Figure 5:
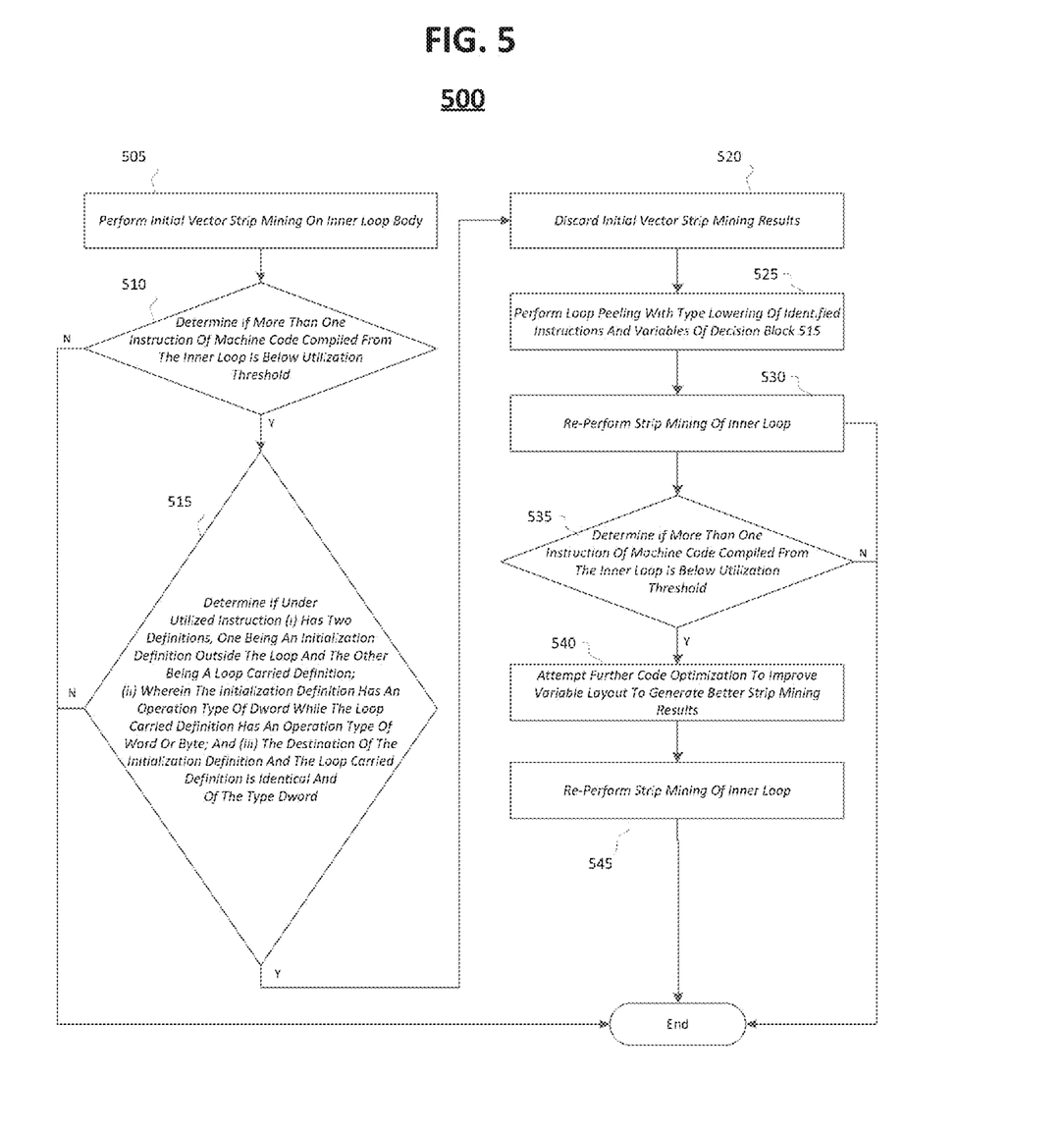
FIG. 5 illustrates one embodiment of a logic flow.

FIG. 5 illustrates one embodiment of a logic flow 500 in which vector strip mining and loop peeling techniques for optimizing RSA processing are described according to embodiments of the invention. The logic flow 500 may be representative of some or all of the operations executed by one or more embodiments described herein.

Direct porting of RSA processing from a CPU only implementation to a combination of CPU and GPU will not likely result in the most efficient use of the available resources. The RSA code written for the CPU may not be optimized to run on a GPU. Through vector strip mining and loop peeling, the RSA code may be optimized to run more efficiently on a heterogeneous CPU/GPU platform.

In the illustrated embodiment shown in FIG. 5, the logic flow 500 may perform an initial vector strip mining on the inner loop body of source code at block 505. Vector strip mining is a process of optimally reducing high level instructions of arbitrary vector lengths, particularly within a loop of source code, into hardware supported vector widths. For example, the shift operation (see, Table 1) for the vector strip mined code that was written for a CPU only implementation may have resulted in seven (7) machine code instructions (see, Table 2). However, none of the seven (7) machine code instructions utilizes the GPU's maximum available instruction hardware bandwidth of eight (8) causing overall performance to suffer.

The logic flow 500 may determine if more than one instruction of machine code compiled from the inner loop is below the GPU instruction bandwidth utilization threshold at block 510. From above, the initial vector strip mined code may have resulted in seven (7) machine code instructions, none of which utilize the total available instruction bandwidth. Thus, the inner loop may be a candidate for optimization provided certain additional conditions can be met. If the machine code instruction set includes no more than one underutilized instruction there may be no need for further optimization. The embodiments are not limited to this example.

The logic flow 500 may determine if an underutilized machine code instruction meets three (3) additional criteria at block 515. For example, a first criteria may be to determine whether an underutilized machine code instruction is associated with two (2) definitions in the source code. The first definition being an initialization definition that occurs outside the inner loop and the second definition being a loop carried definition. A second criteria may be to determine if the initialization definition has an operation type of dword while the loop carried definition has an operation type of word or byte. A third criteria may be to determine whether the destination of the initialization definition and the loop carried definition is identical and of the type dword. If all three (3) of the above criteria are not met, the code may not be eligible for the type of optimization described herein. The embodiments are not limited to this example.

The logic flow 500 may discard the initial vector strip mining results at block 520. For example, if the three (3) criteria set out above are met, the inner loop source code may be optimizable by the compiler. In such case, the initial vector strip mining results obtained at block 505 may be discarded. The embodiments are not limited to this example.

The logic flow 500 may perform a loop peeling procedure at block 525. For example, the first iteration of the inner loop may be peeled out prior to strip mining the code. The logic flow 500 may then lower the type for the operand prod identified in block 515 from u32 to u16 used in the critical shift operation in the remainder of the inner loop of code. The type for shift may be lowered as well because its initialization definition outside the loop is zero (0) which can be represented in ushort and its other loop carried definition is prod which was just lowered to word type in the peeled out remainder of the inner loop of code. The embodiments are not limited to this example.

The logic flow 500 may re-perform the vector strip mining optimization of the inner loop at block 530. For example, the optimized transformed code for the inner loop may be re-written after vector strip mining as shown in Table 5. The type lowered operands used in the peeled out loop are now named wshift and wprod. The embodiments are not limited to this example.

The logic flow 500 may again determine if more than one instruction of machine code compiled from the inner loop of source code is below the instruction bandwidth utilization threshold at block 535. After block 530 above, the re-performed vector strip mined code may have resulted in four (4) machine code instructions, only one of which utilizes the total available instruction bandwidth. Thus, the inner loop of source code may be a candidate for further optimization because there remain more than one underutilized machine code instruction. If there are less than two machine code instructions that underutilize the available GPU hardware bandwidth then the RSA code optimization process is complete. The embodiments are not limited to this example.

The logic flow 500 may attempt further code optimization to improve variable layout to generate better strip mining results at block 540. For example, an additional optimization to the layout of type lowered variables may be made to further reduce the number of the movs after compiling the inner loop of source code. For instance, the 16-wide wshift variable may be split into two 9-wide wshift1 and wshift2 variables. This improved layout may result in the transformed code shown in Table 5 in which the type lowered operands used in the peeled out loop of source code are now named wshift1, wshift2, and wprod. The embodiments are not limited to this example.

The logic flow 500 may re-perform the vector strip mining of the inner loop of source code at block 545. For example, compiling the code generated at block 540 may yield three (3) machine code mov instructions. This may be the optimal sequence because only one of the machine code instructions in the shift operation underutilizes the available GPU hardware bandwidth which cannot be avoided. Although the SIMD16 merge instruction has been split into two SIMD8 instructions, the instruction throughput remains the same as the instruction pipeline will internally break down the SIMD16 instruction into two SIMD8 instructions automatically. The embodiments are not limited to this example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Figure 6:
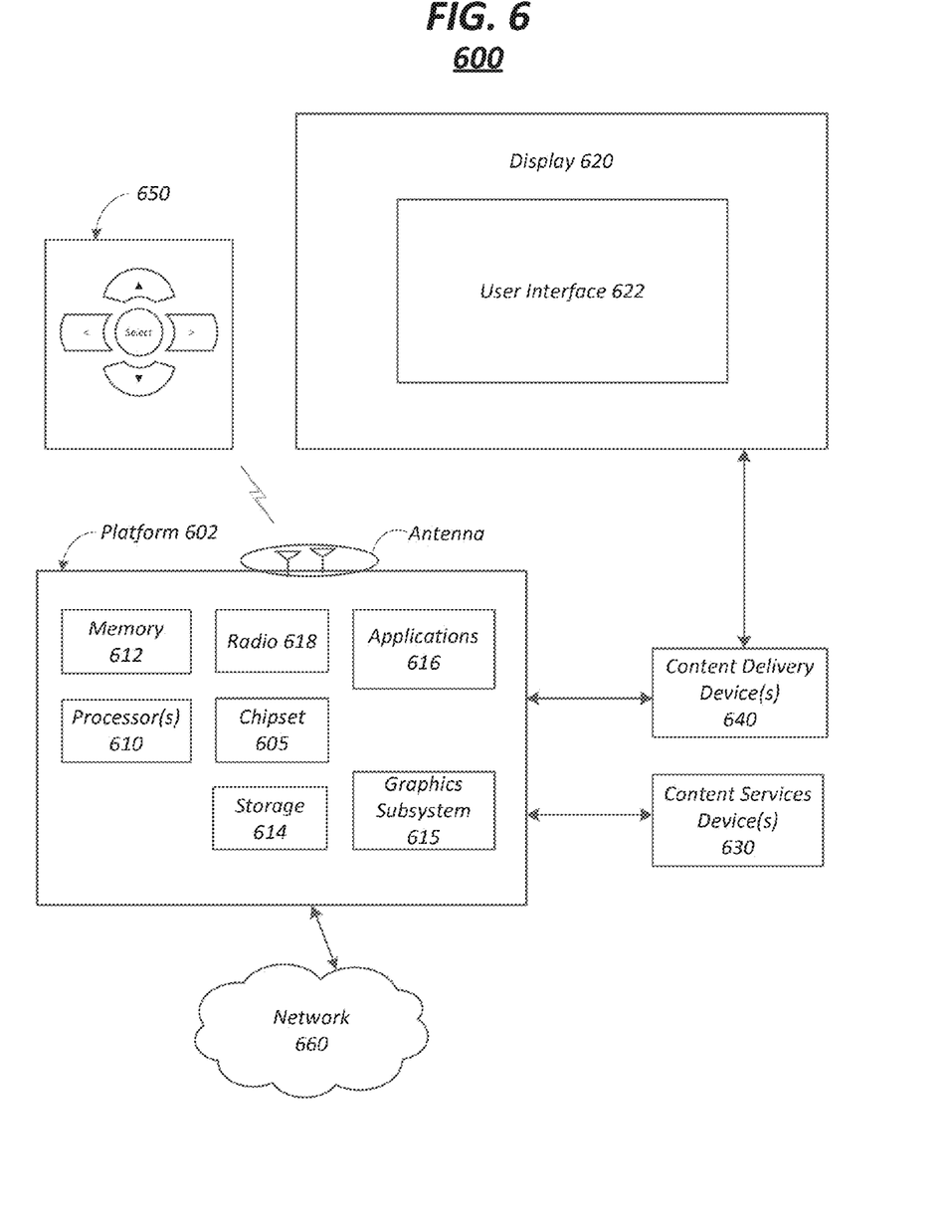
FIG. 6 illustrates an embodiment of a system that may be suitable for implementing embodiments of the disclosure.

FIG. 6 illustrates an embodiment of a system 600 that may be suitable for implementing the GPGPU RSA processing embodiments of the disclosure. In embodiments, system 600 may be a media system implementing RSA although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these components is described in more detail below.

In embodiments, platform 602 may comprise any combination of a chipset 605, processor(s) 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor(s) 610 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor(s) 610 may comprise dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, display 620 may comprise any television type monitor or display. Display 620 may comprise, for example, a computer display screen, touch screen display, video monitor, television-like device, and/or a television. Display 620 may be digital and/or analog. In embodiments, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In embodiments, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, medical and gaming information, and so forth.

Content services device(s) 630 receives content such as cable television programming including media information, digital information, and/or other content. Examples of content providers may include any cable or satellite television or radio or Internet content providers. The provided examples are not meant to limit embodiments of the invention.

In embodiments, platform 602 may receive control signals from navigation controller 650 having one or more navigation features. The navigation features of controller 650 may be used to interact with user interface 622, for example. In embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In embodiments, controller 650 may not be a separate component but integrated into platform 602 and/or display 620. Embodiments, however, are not limited to the elements or in the context shown or described herein.

In embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 6.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
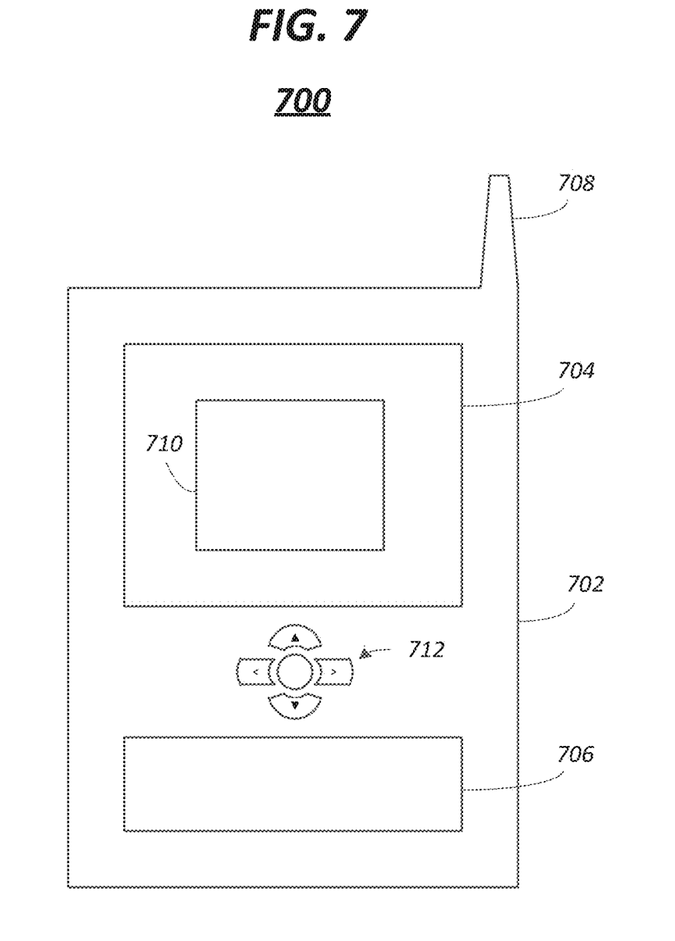
FIG. 7 illustrates embodiments of a small form factor device in which the system of FIG. 6 may be embodied.

As described above, system 600 may be embodied in varying physical styles or form factors. FIG. 7 illustrates embodiments of a small form factor device 700 in which system 600 may be embodied. In embodiments, for example, device 700 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
    compiling source code having an inner loop body using a graphics processing unit (GPU) compiler;
    determining whether more than one machine code instruction of compiled source code under-utilizes GPU instruction bandwidth limitations; and
    in response to a determination that more than one machine code instruction of compiled source code under-utilizes the GPU instruction bandwidth limitations:
        peeling the first iteration of the inner loop body out of the loop;
        lowering the type of operands in the source code; and
        reducing instructions of arbitrary vector lengths into graphics processing unit (GPU) supported vector lengths in the peeled out inner loop body of a source code using vector strip mining to obtain optimized source code.

2. The method of claim 1 comprising:
    determining when more than one machine code instruction of compiled source code under-utilizes GPU instruction bandwidth limitations results from source code having at least one operand that has two definitions, one definition comprising an initialization definition outside the inner loop body and the other definition comprising a loop carried definition;
    determining when the initialization definition has an operation type of dword while the loop carried definition has an operation type of word; and
    determining when the destination of the initialization definition and the loop carried definition is identical and of the type dword.

3. The method of claim 2, comprising:
    splitting 16-wide variables of the optimized source code into two 9-wide variables; and
    reducing instructions of arbitrary vector lengths into GPU supported vector lengths in the optimized source code using vector strip mining to obtain further optimized source code.

4. The method of claim 1 wherein the source code is configured to process a Rivest, Shamir, and Adleman (RSA) decryption algorithm.

5. An apparatus, comprising:
    a graphics processing unit (GPU); and
    a GPU compiler operative to:
        compile an inner loop body of source code;
        determine whether more than one machine code instruction of compiled source code under-utilizes GPU instruction bandwidth limitations; and
        in response to a determination that more than one machine code instruction of compiled source code under-utilizes the GPU instruction bandwidth limitations:
            peel the first iteration of the inner loop body out of the loop; and
            lower the type of operands in the source code.

6. The apparatus of claim 5, the GPU compiler operative, based on the determination, to reduce instructions of arbitrary vector lengths into GPU supported vector lengths in the peeled out inner loop body of a source code using vector strip mining to obtain optimized source code.

7. The apparatus of claim 6, the GPU compiler operative to:
    determine when more than one machine code instruction of compiled source code under-utilizes GPU instruction bandwidth limitations results from source code having at least one operand that has two definitions, one definition to comprise an initialization definition outside the inner loop body and the other definition to comprise a loop carried definition;
determine when the initialization definition has an operation type of dword while the loop carried definition has an operation type of word; and
determine when the destination of the initialization definition and the loop carried definition is identical and of the type dword.

8. The apparatus of claim 7, the GPU compiler operative to:
split 16-wide variables into two 9-wide variables; and
reduce instructions of arbitrary vector lengths into GPU supported vector lengths in the optimized source code using vector strip mining to obtain further optimized source code.

9. The apparatus of claim 7 wherein the GPU is part of a heterogeneous processor architecture comprising a CPU and the GPU on the same processor die.

10. The apparatus of claim 7 wherein the source code is for processing a Rivest, Shamir, and Adleman (RSA) decryption algorithm.

11. A system, comprising:
a central processing unit (CPU) operative to execute a main Rivest, Shamir, and Adleman (RSA) decryption function set to a value of M;
a graphics processing unit (GPU) coupled to the CPU, the GPU operative to:
    execute GPU functions comprised of source code configured to perform RSA calculations to compute the value for M; and
    return the value for M to the main RSA decryption function executing on the CPU, and
a GPU compiler operative on the GPU to:
    reduce instructions of arbitrary vector lengths into GPU supported vector lengths in an inner loop body of the source code using vector strip mining; and
    determine when more than one machine code instruction of compiled source code under-utilizes GPU instruction bandwidth limitations.

12. The system of claim 11, the GPU compiler operative to:
discard the initial vector strip mining results;
peel the first iteration of the inner loop body out of the loop;
lower the type of operands in the source code; and
reduce instructions of arbitrary vector lengths into GPU supported vector lengths in the peeled out inner loop body of the source code using vector strip mining to obtain optimized source code.

13. The system of claim 12, the GPU compiler operative to:
determine when more than one machine code instruction of compiled source code under-utilizes GPU instruction bandwidth limitations results from source code having at least one operand that has two definitions, one definition comprising an initialization definition outside the inner loop body and the other definition comprising a loop carried definition;
determine when the initialization definition has an operation type of dword while the loop carried definition has an operation type of word; and
determine when the destination of the initialization definition and the loop carried definition is identical and of the type dword.

14. The system of claim 12, the GPU compiler operative to:
split 16-wide variables into two 9-wide variables; and
reduce instructions of arbitrary vector lengths into GPU supported vector lengths in the optimized source code using vector strip mining to obtain further optimized source code.

15. The system of claim 11 in which the CPU and the GPU are on the same processor die.

16. The system of claim 15 in which the processor die is integrated into a mobile computing device.

17. A method, comprising:
passing parameters of a Rivest, Shamir, and Adleman (RSA) decryption algorithm set to a value M from a central processing unit (CPU) main function operative to be executed on a CPU to a graphics processing unit (GPU) function operative to be executed on a GPU, the GPU function comprised of source code that includes an inner loop body for calculating M;
reducing instructions of arbitrary vector lengths into GPU supported vector lengths in an inner loop body of the source code using vector strip mining;
re-writing the GPU function source code when more than one machine code instruction of compiled GPU function source code under-utilizes GPU instruction bandwidth limitations;
computing a value for M on the GPU; and
returning the value for M to the CPU main function.

18. The method of claim 17, comprising:
determining when an under-utilized machine code instruction results from source code having at least one operand that has two definitions, one definition comprising an initialization definition outside the inner loop body and the other definition comprising a loop carried definition;
determining when the initialization definition has an operation type of dword while the loop carried definition has an operation type of word; and
determining when the destination of the initialization definition and the loop carried definition is identical and of the type dword.

19. The method of claim 18, comprising:
discarding the initial vector strip mining results;
peeling the first iteration of the inner loop body out of the loop; and
lowering the type of operands in the source code.

20. The method of claim 19, comprising:
reducing instructions of arbitrary vector lengths into GPU supported vector lengths in the peeled out inner loop body of the source code using vector strip mining to obtain optimized source code.

21. The method of claim 20, comprising:
splitting 16-wide variables of the source code into two 9-wide variables; and
reducing instructions of arbitrary vector lengths into GPU supported vector lengths in the optimized source code using vector strip mining to obtain further optimized source code.

22. An article of manufacture comprising a non-transitory computer-readable storage medium containing instructions that when executed cause a system to:
compile source code having an inner loop body using a graphics processing unit (GPU) compiler;
determine whether more than one machine code instruction of compiled source code under-utilizes GPU instruction bandwidth limitations; and
in response to a determination that more than one machine code instruction of compiled source code under-utilizes the GPU instruction bandwidth limitations:

peel the first iteration of the inner loop body out of the loop;

lower the type of operands in the source code; and reduce instructions of arbitrary vector lengths into graphics processing unit (GPU) supported vector lengths in the peeled out inner loop body of a source code using vector strip mining to obtain optimized source code.

23. The article of claim 22 containing instructions that when executed cause a system to:

determine when more than one machine code instruction of compiled source code under-utilizes GPU instruction bandwidth limitations results from source code having at least one operand that has two definitions, one definition to comprise an initialization definition outside the inner loop body and the other definition to comprise a loop carried definition;

determine when the initialization definition has an operation type of dword while the loop carried definition has an operation type of word; and determine when the destination of the initialization definition and the loop carried definition is identical and of the type dword.

24. The article of claim 23 containing instructions that when executed cause a system to:

split 16-wide variables of the optimized source code into two 9-wide variables; and reduce instructions of arbitrary vector lengths into GPU supported vector lengths in the optimized source code using vector strip mining to obtain further optimized source code.

25. The article of claim 23 containing instructions that when executed cause a system to process a Rivest, Shamir, and Adleman (RSA) decryption algorithm.

* * * * *